United States Patent
Chen et al.

(10) Patent No.: US 12,028,154 B2
(45) Date of Patent: Jul. 2, 2024

(54) PON OPTICAL DATA RECEIVER WITH TOLERANCE TO RAPID DRIFT OF CENTER WAVELENGTH OF DATA-MODULATED OPTICAL SIGNAL

(71) Applicant: Nokia Solutions and Networks Oy, Espoo (FI)

(72) Inventors: Haoshuo Chen, Aberdeen, NJ (US); Nicolas Fontaine, New Providence, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 4 days.

(21) Appl. No.: 17/942,881

(22) Filed: Sep. 12, 2022

(65) Prior Publication Data
US 2023/0081925 A1  Mar. 16, 2023

Related U.S. Application Data (60) Provisional application No. 63/243,599, filed on Sep. 13, 2021.

(51) Int. Cl.
*H04J 14/08* (2006.01)
*H04B 10/27* (2013.01)

(52) U.S. Cl.
CPC ............ *H04J 14/08* (2013.01); *H04B 10/27* (2013.01)

(58) Field of Classification Search
CPC .................................. H04B 10/27; H04J 14/08
USPC .......................................................... 398/16
See application file for complete search history.

(56) References Cited

U.S. PATENT DOCUMENTS

| | | | |
|---|---|---|---|
| 10,715,256 B1 * | 7/2020 | Chen .................... | H04B 10/676 |
| 11,184,086 B1 * | 11/2021 | Chen .................... | H04B 10/69 |
| 2016/0119077 A1 * | 4/2016 | Hu ........................ | H04B 10/516 |
| | | | 398/76 |
| 2017/0317778 A1 * | 11/2017 | Lam ..................... | H04J 14/0282 |
| 2019/0089458 A1 * | 3/2019 | Chen .................... | H04J 14/04 |
| 2019/0319712 A1 * | 10/2019 | Zhang .................. | H04B 10/5161 |
| 2023/0081925 A1 * | 3/2023 | Chen .................... | H04J 14/08 |
| | | | 398/16 |

FOREIGN PATENT DOCUMENTS

| CN | 102075256 A | * | 5/2011 | |
|---|---|---|---|---|
| WO | WO-2010099820 A1 | * | 9/2020 | ......... H04B 10/2587 |

OTHER PUBLICATIONS

Veen et al; Strategies for economical next-generation 50G and 100G passive optical networks ; Jan. 2020; Journal of Optical Communications and Networking vol. 12, No. 1; pp. 1-9. (Year: 2020).*

Zhu et al; Time skew enabled vestigial sideband modulation for dispersion-tolerant direct-detection transmission ;Nov. 2020; Optical society of America; pp. 1-4. (Year: 2020).*

(Continued)

*Primary Examiner* — Amritbir K Sandhu
(74) *Attorney, Agent, or Firm* — HARNESS, DICKEY & PIERCE, P.L.C.

(57) ABSTRACT

An apparatus includes a TDM PON optical transceiver including a direct-detection optical receiver. The direct-detection optical receiver is configured to demodulate data from a temporal segment of a data modulated optical signal, wherein the optical carrier frequency of the segment varies at a rate of, at least, 1 giga-Hertz per second.

20 Claims, 5 Drawing Sheets

(56) References Cited

OTHER PUBLICATIONS

Spott et al; Interbrand cascade laser on silicon ;Aug. 2018; Optical Society of America; pp. 1-10. (Year: 2018).*
Xie et al; Distributed feedback interband cascade lasers with top grating and corrugated sidewalls ; Mar. 2018; Applied Physics Letters 112; pp. 1-6. (Year: 2018).*
Wang et al; Direct detection system based on a single photodiode receiving the independent quadruple-SSB signal, Jul. 2023; Optics Express vol. 31, No. 14; pp. 1-10. (Year: 2023).*
H. Chen et al., "Full-Field, Carrier-Less, Polarization-Diversity, Direct Detection Receiver based on Phase Retrieval", Mar. 6, 2019, 3 pages, available online at: https://arxiv.org/ under article No. 1903.02424.
Y. Yoshida et al, Coherent Detection only by 2-D Photodetector Array: A Discreteness-Aware Phase Retrieval Approach, Optical Fiber Communications Conference and Exhibition (OFC), Mar. 3-7, 2019, paper Th4A.3, 3 pages.
A. Mecozzi et al., "Kramers-Kronig Coherent Receiver", Optica, vol. 3, No. 11, 2016, pp. 1220-1227.
Suzuki et al., "100 GB/s to 1 Tb/s based coherent passive optical network technology", Journal of Lightwave Technology, vol. 36, No. 8, Apr. 15, 2018, pp. 1485-1491.
Kanai et al., "Symmetric 10 Gbit/s 40-km reach DSP-based TDM-PON with a power budget over 50 dB", Optics Express, vol. 29, No. 11, May 24, 2021, pp. 17499-17509.

\* cited by examiner

PON OPTICAL DATA RECEIVER WITH TOLERANCE TO RAPID DRIFT OF CENTER WAVELENGTH OF DATA-MODULATED OPTICAL SIGNAL

This application claims the benefit of U.S. provisional application No. 63/243,599, filed Sep. 13, 2021.

BACKGROUND

Technical Field

The invention relates to apparatus for passive optical networks and methods of operating apparatus in a passive optical network (PON).

Related Art

This section introduces aspects that may be help to facilitate a better understanding of the inventions. Accordingly, the statements of this section are to be read in this light and are not to be understood as admissions about what is prior art or what is not prior art.

Currently a 50G single wavelength, time division multiplexed-PON is in the process of being standardized by ITU-T in G.hsp. Intensity Modulation with Direct Detection (IM-DD) using NRZ-OOK is chosen for 50G due to its low complexity and cost. To enable a power budget of about 29 dB, a digital signal processor (DSP) may be used to overcome bandwidth limitations and enable 20-km reach. Therefore, scaling beyond 50G based on IM-DD while maintaining 20-km reach and a 29 dB power budget may be problematic. From a technology standpoint, coherent PON may be an attractive option to further scale the baud rate due to a superior optical receiver sensitivity, advanced modulation format(s), and digital chromatic dispersion compensation.

Research on higher speed coherent PONs is underway. One challenge for such PONs relates to supporting upstream burst-mode (BM) operation with coherent optical detection.

SUMMARY OF SOME ILLUSTRATIVE EMBODIMENTS

In first embodiments, an apparatus includes a time division multiplexed-passive optical network (TDM-PON) optical transceiver, which includes a direct-detection optical receiver. The direct-detection optical receiver is able to demodulate data from a temporal segment of a data modulated optical signal, wherein the optical carrier frequency of the segment varies at a rate of, at least, 1 giga-Hertz per second (GH/s).

In any of the first embodiments, the optical carrier frequency of the segment may vary at a rate of, at least, 10 GH/s, may vary at a rate of, at least, 100 GH/s or even 10,000 GH/s or more.

In any of the first embodiments, the direct-detection optical receiver may be configured to demodulate the data without mixing the received data modulated signal with an optical local oscillator.

In any of the first embodiments, the direct-detection the direct-detection optical receiver may be configured to demodulate the data without mixing the received data modulated signal with a received co-propagating optical tone.

In any of the first embodiments, the direct-detection optical data receiver may include an optical power splitter, an array of at least three optical intensity detectors, and a digital signal processor. In such embodiments, the digital signal processor is connected to receive digital values of intensity measurements from each of the optical intensity detectors of the array and to recover data of the received data-modulated optical signal from the digital values of the intensity measurements. In such embodiments, the first optical intensity detector is connected to receive light from the optical power splitter via a dispersive optical path and the remaining of the optical intensity detectors of the array are connected to receive light from the optical power splitter via a multiple input and multiple output passive optical processing unit. In such embodiments, the passive optical processing unit is configured to optically mix light received on different optical inputs thereof.

In first embodiments of the previous paragraph, the passive optical processing unit may be configured to optically mix light from at least two optical inputs thereof with a relative time delay. In such embodiments, the relative time delay may be bigger than a temporal broadening produced by the dispersive optical path on data symbols of the received data-modulated optical signal.

In first embodiments of the previous 2 paragraphs, the passive optical processing unit may be configured to optically mix light from at least three of the optical inputs thereof.

In any of the first embodiments, the direct-detection, optical transceiver may be in an optical line terminal (OLT). In such first embodiments, the apparatus may further include one or more optical network units (ONUs) optically connected to the OLT by a PON network, wherein at least one of the one or more ONUs has a laser source to generate the data modulated optical signal. In some such embodiments, the laser source may be an internal cavity laser, e.g., a distributed feedback laser or a distributed Bragg reflector laser. In some embodiments of this paragraph, the laser source may be a laser without a temperature controller, e.g., the one of the one or more ONUs may not have a temperature sensor for the laser source and/or may operate the laser source without active temperature stabilization thereof. In some embodiments of this paragraph, the laser source may not be protected from receiving light by an optical isolator in the one of the one or more ONUs. In some embodiments of this paragraph, the TDM PON optical transceiver may configured to recover data optically transmitted by the one of the one or more ONUs within a first 20 micro-seconds of turning on the laser source of the one of the one or more ONUs.

In some of the first embodiments, the TDM PON optical transceiver may be configured to recover data optically transmitted from an optical transmitter within a first 20 micro-seconds of turning on a laser of the optical transmitter.

Second embodiments may include methods for operating any of the above-described apparatus.

In various Figures, relative dimension(s) of some feature(s) may be exaggerated to more clearly illustrate the feature(s) and/or relation(s) to other feature(s) therein.

In the Figures, similar reference numbers may be used to indicate similar structures and/or structures with similar functions.

Herein, various embodiments are described more fully by the Figures and the Detailed Description of Illustrative Embodiments. Nevertheless, the inventions may be embodied in various forms and are not limited to the embodiments described in the Figures and the Detailed Description of Illustrative Embodiments.

DETAILED DESCRIPTION OF ILLUSTRATIVE EMBODIMENTS

The Detailed Description of the Illustrative Embodiments and drawings merely illustrate principles of the inventions. Based on the present specification, those of ordinary skill in the relevant art will be able to devise various arrangements that, although not explicitly described or shown herein, embody the inventions and are included within the scope of the claims. Also, statements herein reciting principles, aspects, and embodiments are intended to encompass equivalents thereof.

U.S. provisional application No. 63/243,599, "PON Optical Data Receiver with Tolerance to Rapid Drift of Center Wavelength of Data-Modulated Optical signal", filed Sep. 13, 2021, is incorporated by reference herein, in its entirety.

U.S. Pat. Nos. 10,715,256 and 11,184,086 describe various different direct-detection optical data receivers and different methods of using such direct-detection optical data receivers. These direct-detection optical data receivers and methods of use thereof may be incorporated in various embodiments of the present inventions. U.S. Pat. Nos. 10,715,256 and 11,184,086 are incorporated by reference herein, in their entirety.

Herein, various embodiments provide time-division multiplexed (TDM) PON optical receivers and optical transceivers and PON networks in which, at least, one of the optical data receivers is specially configured to perform direct-detection (DD) of a data-modulated optical carrier. The specially configured optical data receiver(s) is(are) typically capable of measuring the phase of said data-modulated optical signal without a local optical oscillator and without a need to measure optical mixing between the received data-modulated optical signal and a co-propagating and separately produced, optical carrier tone.

Such DD optical receiver(s) may be less expensive than optical data receivers that use a local optical oscillator and may still be able to recover information on the phase of the data-modulated optical signal.

Due to the absence of use of a local optical oscillator or a separately produced, optical carrier tone for interfering with the data-modulated optical signal, the DD optical data receiver may be able to recover data from temporal slices of the received data-modulated optical signal whose center optical carrier frequency is rapidly varying in time. For example, the central optical carrier frequency of such a temporal slice of segment of the data-modulated optical signal may vary at a rate of 1 or more giga-Hertz per second (GH/s), preferably 10 or more GH/s, more preferably 100 or more GH/s, 1000 or more GH/s, or even 10,000 or more GH/s. Indeed, some embodiments of the DD optical receiver may even be able to recover data from temporal slices of the data-modulated optical signal whose center optical carrier frequency is varying by one million or more GH/s.

Figure 1:
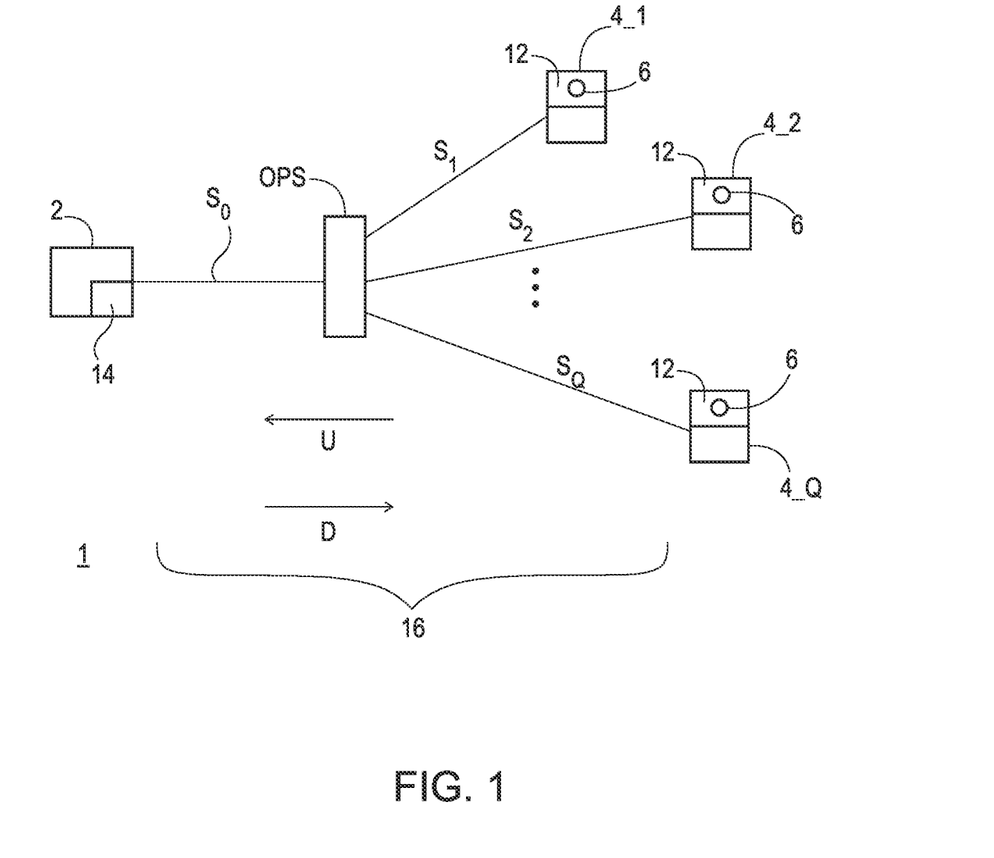
FIG. 1 is block diagram schematically illustrating a PON, optical fiber communication system, in which one or more of the optical data transceivers includes a direct-detection (DD) optical data receiver configured to be tolerant of rapid shifts of the optical carrier frequency of a received data-modulated optical signal.

FIG. 1 illustrates a passive optical network (PON) 1 with an optical line terminal (OLT) 2 and multiple optical network units (ONUs) 4_1, 4_2, . . . 4_Q and a passive optical fiber network 16 optically connecting the OLT 2 to the ONUs 4_1-4_Q for supporting both upstream and downstream optical data communications. The OLT 2 and the individual ONUs 4_1-4_Q have corresponding PON optical transceivers therein to support such optical communications. In the PON 1, the various optical data transceivers thereof are configured for time-division multiplexed (TDM), optical data communications, e.g., in the upstream (U) and/or downstream directions (D). The passive optical fiber network 16 optically connects the OLT 2 to the ONUs 4_1-4_Q for optical data communications. The passive optical fiber network 16 includes optical fiber spans $S_0, S_1, S_2, \ldots S_Q$, e.g., single-mode optical fibers, and a 1×Q optical power splitter OPS optically connecting the optical fiber spans $S_o$-$S_Q$.

The PON 1 includes one or more DD optical data receivers 14. In FIG. 1, the DD optical data receiver 14 is illustrated as being located in the OLT 2, but one or more of the ONUs 4_1-4_Q may similarly have a DD optical data receiver in some embodiments.

In FIG. 1, the DD optical data receiver 14 of the OLT 2 is connected to receive data-modulated optical signals from the ONUs in a TDM manner. Each ONU 4_1-4_Q includes an optical data transmitter 12 configured to transmit a data-modulated optical signal to the DD optical data receiver 14 during assigned temporal burst slots. The optical signal may carry data modulated according to an amplitude and/or phase-modulation scheme, e.g., ON-OFF keying (OOK), pulse amplitude modulation (PAM) such as PAM-4 or PAM-8, binary phase shift keying (BPSK), quadrature phase keying (QPSK), and/or quadrature amplitude modulation (QAM) such as N-QAM for N>4. The DD optical data receiver 14 typically may recover the optically transmitted data from the received optical signal, e.g., by intensity measurements of multiple optical projections thereof, as described below.

The optical data receiver 14 of the OLT has a tolerance to rapid shifts of the optical carrier frequency of the data-modulated optical signals received from the optical data transmitters 12 of the ONUs 4_1-4_Q. This tolerance may enable the DD optical data receiver 14 to recover data from a data-modulated optical signal transmitted by individual one(s) of the ONUs 4_1-4_Q, whose optical data transmitter 12 has a low quality and/or has an inexpensive laser 6. For example, in some embodiments, some or all of the lasers (6)

may be a distributed Bragg reflector laser without an external segment of the laser cavity or a distributed feedback laser without an external segment of the laser cavity, which could otherwise enable better control of the lasing wavelength. Also, in some embodiments, some of the lasers (6) may be operated without an optical isolator in the corresponding ONU(s) 4_1-4_Q so that external light received by those laser(s) 6 may cause drift of the lasing wavelength. Finally, in some embodiments, some of the lasers (6) may not have thermal stabilization in the corresponding ONU(s) 4_1-4_Q, e.g., may not have significant thermal insulation and/or may not have active temperature control. For example, the corresponding ONU(s) 4_1-4_Q may not have a temperature sensor for monitoring the corresponding laser's temperature and/or may not provide feedback-controlled cooling of those laser(s) 6. Thus, inexpensive laser(s) may be used in some of the ONUs 4_1-4_Q, because of the ability of the distant DD optical data receiver 14 to demodulate data-modulated onto temporal segments or slices of the optical signal whose center frequency is rapidly shifting.

In the embodiment illustrated in FIG. 1, for which the carrier-frequency-shift tolerant, DD optical data receiver 14 is in the OLT 2 of the PON 1, one or more of the ONUs 4_1-4_Q, e.g., at customer locations can be such that one or more of the lasers 6 are inexpensive internal cavity lasers thereby reducing the costs of such ONUs 4_1-4_Q of the PON 1. Indeed, such an OLT 2 may also be able to recover data modulated onto the optical signal almost immediately after the start of an upstream burst for optical transmission from an individual one of the ONUs 4_1-4_Q. Such data recovery may even be for data optically transmitted in the first 20 micro-seconds after turning on the laser 6 of the optically transmitting ONU 4_1-4_Q even though, during that time period, the center frequency of the optical carrier typically shifts by a large amount for such laser(s) 6 in the absence of temperature control thereof. Near the start of such an upstream burst, the center wavelength of the optical carrier of the transmitting ONU 4_1-4_Q typically changes rapidly, but the OLT 2 having the tolerant DD optical data receiver 14 may still be able to demodulate data modulated onto the optical carrier during such a period of rapid shift of the center frequency or center wavelength of the relevant optical carrier.

FIGS. 2-5 illustrate some embodiments of optical data receivers 14_1, 14_2, 14_3, 14_4, which may be used for any DD optical data receivers of an embodiment of a PON, e.g., for the DD optical data receiver 14 of the PON 1 shown in FIG. 1. The optical data receivers 14_1, 14_2, 14_3, 14_4 may recover phase(s) of a received data-modulated optical signal from measured intensities of optical projections of the received data-modulated optical signal. The optical projections are typically produced by passive optical processing and typically do not involve interference of said data-modulated optical signal with an unmodulated optical carrier from a local optical oscillator or from a co-propagated unmodulated optical carrier or tone, e.g., which was produced separately from the data-modulated optical signal. The passive optical processing may include producing three or more different optical projections of the received data-modulated optical signal. Intensity measurements of said optical projections enable, at least, recovery of phase-modulations carried by the data-modulated optical signal and may also enable recover of amplitude modulations thereon in some embodiments. In some embodiments, the DD optical data receiver 14_1, 14_2, 14_3, 14_4 may have photonic integrated devices therein, e.g., the passive optical processing may be performed by a substantially planar integrated photonic circuit.

Herein, "optical signal" refers to an optical signal in one wavelength channel, and the signal may typically have one polarization mode. But, some embodiments may include parallel optical and/or electrical processing structures, e.g., of similar form, to support wavelength division multiplexing (WDM), polarization division multiplexing, and/or super channel, i.e., multiple optical sub-carriers, optical communications.

Figure 2:
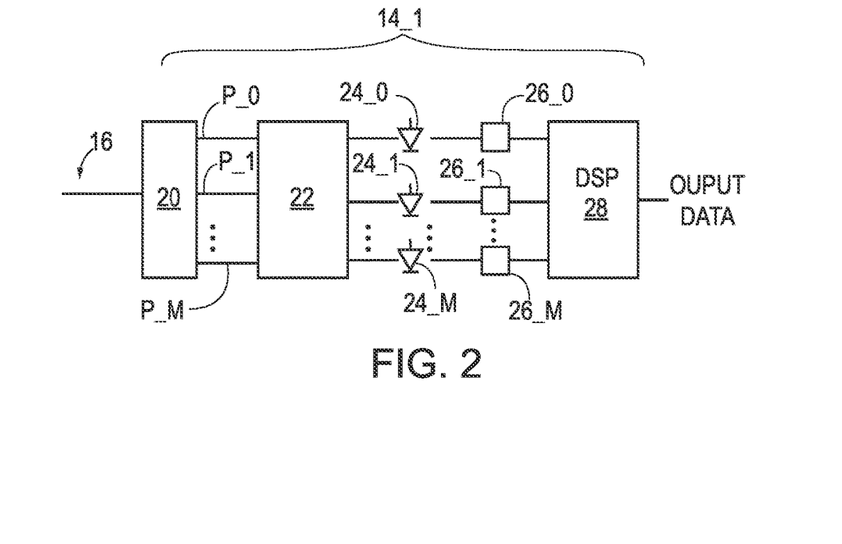
FIG. 2 is a block-diagram schematically illustrating a DD optical data receiver configured to configured to be tolerant of rapid shifts of the optical carrier frequency of a received data-modulated optical signal, e.g., a receiver for use in the PON system of FIG. 1.

FIG. 2 schematically illustrates an embodiment 14_1 of the DD optical data receiver of FIG. 1. The DD optical data receiver 14_1 includes a 1×(M+1) optical power splitter 20, an (M+1)×(M+1) passive optical processing unit 22, an array of (M+1) photodetectors 24_0, 24_1, . . . 24_M, (M+1) analog electrical sampling circuits 26_0, 26_1, . . . 26_M, and a DSP 28 with (M+1) digital inputs. Here, M is an integer greater than or equal to 2.

The 1×(M+1) optical power splitter 20 optically splits the data-modulated optical signal received from the near end of the optical fiber network 16 into (M+1) separate portions and directs each of the portions to a corresponding one of (M+1) optical paths P_0, P_1, . . . P_M. The 1×(M+1) optical power splitter 20 may be a conventional symmetric or non-symmetric, passive optical power splitter. The individual optical paths P_0-P_M direct the portions of the received data-modulated optical signal to corresponding optical inputs of the (M+1)×(M+1) passive optical processing unit 22, approximately in parallel.

The (M+1)×(M+1) passive optical processing unit 22 forms (M+1) optical projections of the portions of the optical signal, which are received at the optical inputs thereof, e.g., by passive optical processing, and outputs the optical projections, in approximate parallel, to the (M+1) photodetectors 24_0-24_M. The (M+1) individual optical signals at the (M+1) optical outputs of the (M+1)×(M+1) passive optical processing unit 22 are typically different optical projections of the received optical signal. In the (M+1)×(M+1) optical processing unit 22, the optical processing, at least, includes optically dispersing the portion of the optical signal received from the first optical path P_0 and optically mixing the portions of the optical signal received from at least, two of the M optical paths P_1-P_M, and may also include relatively time delaying one or more of those portions, prior to said optically mixing. Typically, the DD optical data receiver 14_1 does not allow light in the dispersive first optical path P_0 to significantly optically mix with other light of other optical paths in the (M+1)×(M+1) passive optical processing unit 22.

In various embodiments, the relative delay(s) introduced between light from the M optical paths P_1-P_M may be determined or selected based, in part, on the expected maximum rate of shift of the central optical carrier frequency of the received data-modulated optical signal. In particular, the relative delays may be shorter when the central optical carrier frequency is expected to potentially have a larger potential shift rate, e.g., based on the type of laser(s) 6 in the ONUs 4_1-4_Q of FIG. 1 and/or lack of temperature control of said laser(s) 6 or based on training.

Each photodetector 24_0-24_M, receives light from a corresponding one of the optical outputs of the (M+1)×(M+1) optical processing unit 22 and transmits an electrical signal representative of the measured intensity of said received light to a corresponding one of the analog electrical sampling circuits 26_0-26_M. Each photodetector 24_0-

24_M may be, e.g., a reversed biased photodiode, i.e., in a single ended configuration, or a suitably biased photosensitive transistor.

Each of the (M+1) analog electrical sampling circuits 26_0-26_M performs temporal sampling to provide analog-to-digital (A/D) conversion of the electrical intensity measurement received from the corresponding one of the photodetectors 24_0-24_M to a temporal series of digital values. The analog electrical sampling circuits 26_0-26_M digitize the intensity measurements, e.g., at a sampling rate equal to the data symbol rate or equal to an integer multiple of data symbol rate. The individual analog electrical sampling circuits 26_0-26_M optionally may include conventional analog electrical amplifiers and/or electrical filters for processing of received electrical signals prior to the analog-to digital (A/D) conversion thereof.

The DSP 28 receives, e.g., approximately in parallel, the (M+1) digital values for the intensity measurements of the optical projections from the analog electrical sampling circuits 26_0-26_M at (M+1) and recovers values representative of the transmitted data-modulated optical signal therefrom, i.e., including recovering phase modulated data. The recovery is based on parallel digital processing of the received digital values of the (M+1) intensity measurements of the passive optical projections, in a sampling period. Said recovery may also based on a recovery of pilot symbol values carried by the optical signal, in pilot symbol intervals, e.g., as discussed below.

In the DSP 28, the digital processing to recover the phase-modulated data may use, in part, information about optical channel matrices for the relevant optical path through the optical fiber network 16, the passive optical processing unit 22 and/or the communicating optical data transmitter 12 of FIG. 1. Herein, an optical channel matrix is a matrix that determines a sequence of output optical signals from one or more optical paths in response to the one or more optical paths receiving a sequence of input optical signals. In the DSP 28, the needed information about such optical channel matrices may be obtained prior to or during operation of the DD optical data receiver 14_1 by explicit measurement and programming or adjustment and/or by dynamic training and/or monitoring, e.g., based on reception of optical pilot symbols having known transmission forms and/or known transmission time slots.

The DSP 28 may also do digital processing to compensate or correct for undesired optical effects such as one or more of optical dispersion, attenuation, noise production, optical non-linear distortion, and/or polarization rotation, which are, e.g., caused by propagation over the relevant optical path of the optical fiber network 16, etc.

Finally, the optical data receiver 14_1 may also include one or more optical filter(s), e.g., to enable wavelength channel selection and/or polarization selection (not shown) on the optical signal received from the near end of the optical fiber network 16 and/or optical amplifier(s) to compensate for some optical attenuation, e.g., in the optical fiber network 16.

Figure 3:
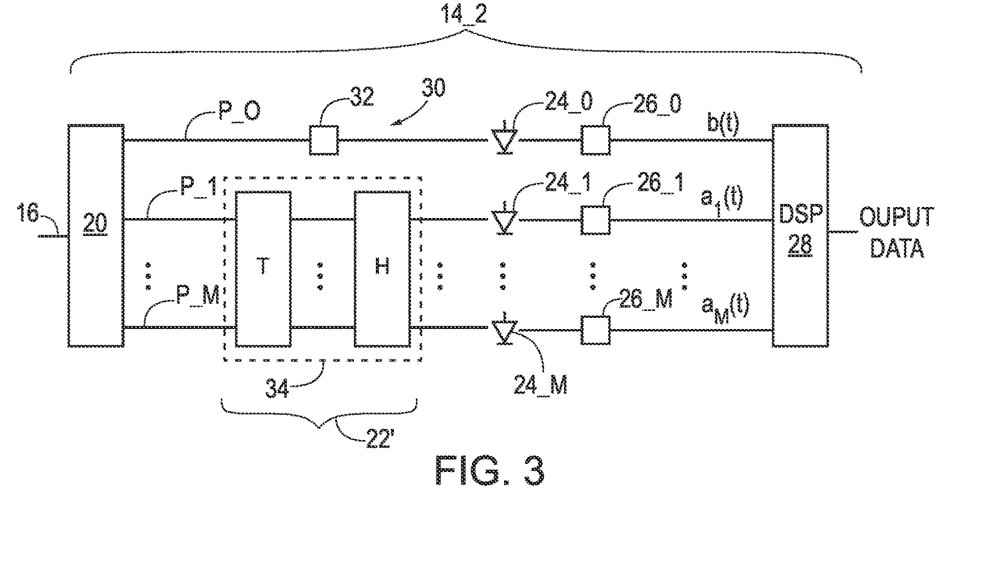
FIG. 3 is a block diagram schematically illustrating a DD optical data receiver with a specific embodiment of the M×M passive optical projection unit of FIG. 2.

FIG. 3 schematically illustrates an embodiment 14_2 of the optical data receiver 14_1 of FIG. 2 with a specific embodiment 22' of the (M+1)×(M+1) passive optical processing unit 22 of FIG. 2. The (M+1)×(M+1) passive optical processing unit 22' includes an optically separate first optical path 30 and an M×M passive optical processing unit 34. The first optical path 30 receives light only from the first optical path P_0. In parallel, the M×M passive optical processing unit 34 receives light only from the M remaining optical paths P_1-P_M. That is, the M×M passive optical processing unit 34 is a multiple input and multiple output, passive optical device. Also, the M optical paths P_1-P_M may be, e.g., short optical paths of about the same optical path length, at the operating wavelength of the optical receiver 14_2. The first optical path 30 and the M optical outputs of the M×M passive optical processing unit 34 direct (M+1) separate optical projections of the received data-modulated optical signal to corresponding ones of the (M+1) photodetectors 24_0, 24_1 . . . 24_M. The electrical outputs of the individual photodetectors 24_0 . . . 24_M are time-sampled by corresponding ones of the analog electrical sampling circuits 26_0, 26_1 . . . 26_M to produce, in parallel, M+1 digital intensity measurements $b(t), a_1(t) \ldots a_M(t)$, at sampling times "t". The digital intensity measurements $b(t), a_1(t) \ldots a_M(t)$ are sent, approximately in parallel, to the DSP 28.

The first optical path 30 typically includes an optically dispersive element 32 that optically disperses the portion of the optical signal received from optical path P_0. The optically dispersive element 32 produces substantial optical dispersion in the received portion of the optical signal, e.g., may cause optical mixing over multiple data symbol time slots. The optically dispersion element 32 may be, e.g., a length of chromatically dispersive optical fiber or another conventional optically dispersive device.

The M×M passive optical processing unit 34, at least, optically mixes light received from one or more pairs of the M optical paths P_1-P_M. The M×M passive optical processing unit 34 is formed by an M×M T module serially connected to an M×M H module.

The M×M T module introduces relative delay(s) between the light received from one or more pairs of the M optical paths P_1-P_M. Over the array of M optical paths P_1-P_M, the relative delays may, e.g., linearly increase from optical path to optical path of this array. One or more of the relative delays may be larger than the temporal broadening produced by dispersion in the first optical path 30. In other embodiments, the M×M T module may produce a distribution of relative delays between the M received portions of the data-modulated optical signal, e.g., such that the relative delay increases linearly with optical input to the M×M T module. The T module produces a diagonal linear transformation on the M received portions of the data-modulated optical signal, without causing significant optical mixing of light received from different ones of the optical paths P_1 to P_M.

In various embodiments, the relative delay(s) produced by the M×M T module between the light received from one or more pairs of the M optical paths P_1-P_M may be determined or selected based, in part, on the expected maximum rate of shift of the central optical carrier frequency of the data-modulated optical signal. In particular, the relative delays may be shorter in situations where the central optical carrier frequency is expected to potentially have a larger potential shift rate, e.g., based on the type of laser(s) 6 in the ONUs 4_1-4_Q of FIG. 1 and/or lack of temperature control of said laser(s) 6 or based on training.

The M×M H module optically mixes light received from different optical outputs of the T module. For example, the M×M H module may be an optical coupler that causes optical mixing of said light via evanescent optical fields.

The serial optical processing by the T module and then, the H module produces, at the M optical outputs of the passive optical processing unit 34, optical mixture(s) of the portions of the data-modulated optical signal received from the optical power splitter 20. In, one or more of said optical mixtures, the optically mixed portions of the received data-modulated optical signal may be relatively temporally delayed. The relative delay(s) may be larger than data symbol time slots and may be as big as or bigger than the temporal broadening produced by dispersion in the first optical path 30 on the portion received therein of the received data-modulated optical signal. The relative delays may be greater than a data symbol period and may be multiple times the data symbol period, e.g., 1-100 times said data symbol period. An inventor simulated situation[s], for which one or more of the relative delays was about 10 such data symbol periods for low rates of the shift of the optical carrier frequency of the data-modulated optical signal.

Figure 4:
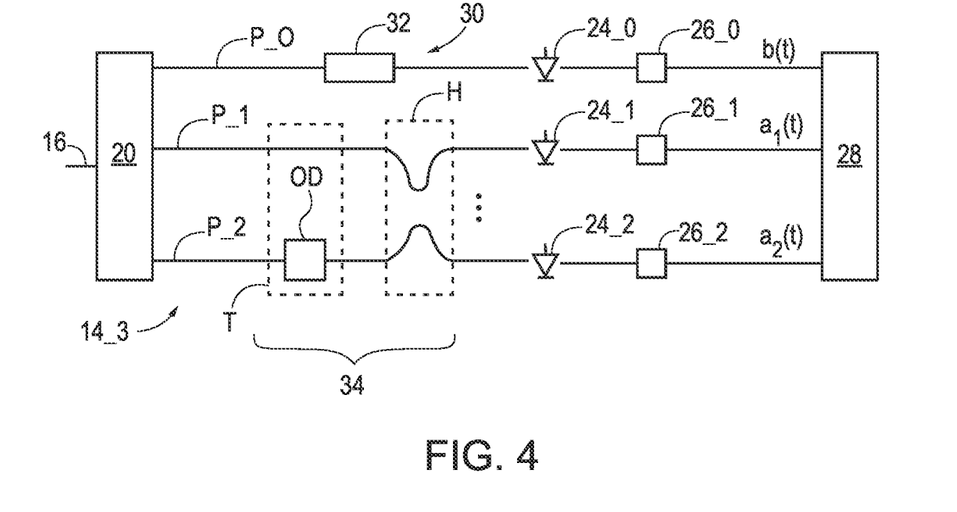
FIG. 4 is a block diagram schematically illustrating an embodiment of a DD optical data receiver according to FIGS. 2-3 with 3 photodetectors per polarization component, i.e., for each of one or more polarization components.

FIG. 4 schematically illustrates an embodiment 14_3 of the DD optical data receivers 14_1, 14_2 of FIGS. 2-3, which includes a 1×3 optical power splitter 20. The 1×3 optical power splitter 20 has a first optical output that connects via optical path P_0 to the first optical path 30 and has second and third optical outputs that connect via respective optical paths P_1 and P_2 to the 2 optical inputs of the 2×2 passive optical processing unit 34.

The 1×3 optical power splitter 20 may be, e.g., a conventional symmetric or asymmetric 1×3 optical power splitter, e.g., an integrated planar optical device.

The first optical path 30 has a conventional optical dispersive element 32 there along. Light propagating through the first optical path 32 may, e.g., accumulate more dispersion than light propagating through optical paths of the 2×2 passive optical processing unit 34.

The 2×2 passive optical processing unit 34 includes a 2×2 T module that outputs light to a 2×2 H module. The 2×2 T module has two optically separate optical paths, e.g., free space and/or planar waveguide optical paths that do not significantly mix light received from different ones of the optical inputs of the 2×2 T module. One of the optical paths of the 2×2 T module has an optical delay element OD there along so that light propagating through said optical path is relatively temporally delayed with respect to light propagating through the other optical path of the 2×2 T module. The 2×2 H module optically mixes light received at the 2 optical inputs thereof, i.e., to function as a 2×2 non-diagonal matrix on the complex light fields or electromagnetic fields received at its 2 optical inputs. One example of such a 2×2 nondiagonal matrix is:

$$\begin{bmatrix} 1 & 1 \\ 1 & -1 \end{bmatrix}.$$

Alternatively, the 2×2 H module may perform other nondiagonal linear transformations on the light fields received at its optical inputs. The 2×2 H module may be a 2×2 passive optical power coupler, e.g., a 2×2 planar waveguide coupler with an evanescent light mixing segment as illustrated in FIG. 4 or a free-space optical mixer.

In various embodiments, the relative delay(s) produced by the 2×2 T module between the light received from the 2 optical paths P_1-P_2 may be determined or selected based, in part, on the rate of shift of the central optical carrier frequency of the data-modulated optical signal. In particular, the relative delays may be shorter in situations where the central optical carrier frequency shifts more rapidly.

In the DD optical data receiver 14_3, light from the first optical path 30 and the 2 optical outputs of the 2×2 H module form 3 passive optical projections of data-modulated optical signal received from the near end of the optical fiber network 16, and the intensities of these 3 passive optical projections are measured by corresponding ones of the photodetectors 24_0, 24_1, 24_2. The intensity measurements of the photodiode 24_0 are temporally sampled by the analog electrical sampling circuit 26_0 to produce the digital signal b(t). The intensity measurements of the photodiodes 24_1 and 24_2 are temporally sampled by the analog electrical sampling circuits 26_1 and 26_2 to produce the digital signals $a_1(t)$ and $a_2(t)$, respectively. The 3 digital signals b(t), $a_1(t)$, and $a_2(t)$ are digital values for the intensity measurements of three passive optical projections of the optical signal received from the near end of the optical fiber network 16. These sets of 3 digital values of the parallel intensity measurements are transmitted to the DSP 28, approximately in parallel, for use in recovery of optionally phase and amplitude values of the transmitted optical signal, e.g., as transmitted by the relevant one of the optical data transmitters 12 of FIG. 1.

Figure 5:
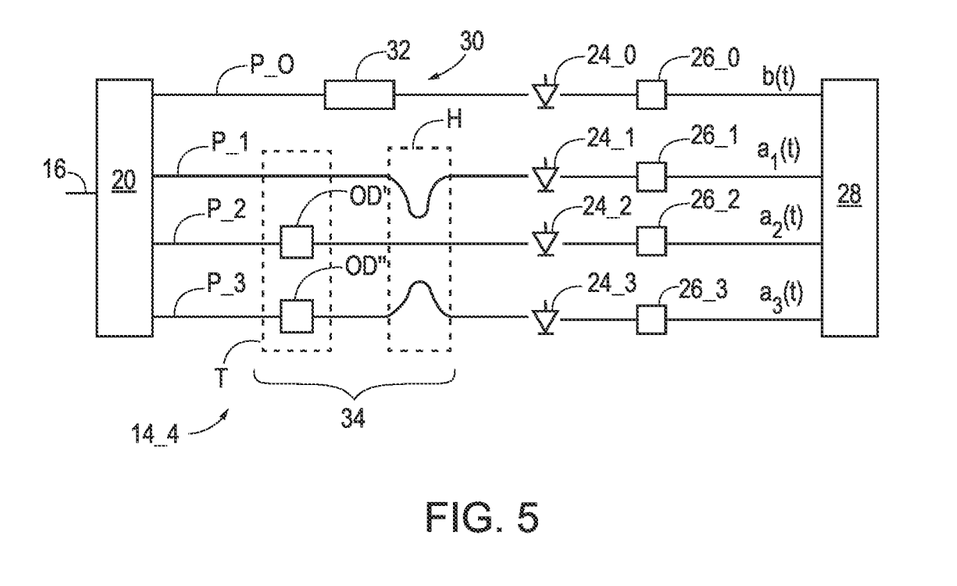
FIG. 5 is a block diagram schematically illustrating an embodiment of a DD optical data receiver according to FIGS. 2-3 with 4 photodetectors per polarization component, i.e., for each of one or more polarization components.

FIG. 5 schematically illustrates another embodiment 14_4 of the DD optical data receivers 14_1, 14_2 of FIGS. 2 and 3. The DD optical data receiver 14_4 includes a 1×4 optical power splitter 20, i.e., a conventional symmetric or asymmetric optical power splitter. The 1×4 optical power splitter 20 has a first optical output that connects via optical path P_0 to the first optical path 30. The first optical path 30 was already described with respect to FIGS. 3-4. The 1×4 optical power splitter 20 has second, third, and fourth optical outputs that connect, in parallel, via the optical paths P_1, P_2, and P_3 to corresponding optical inputs of a 3×3 passive optical processing unit 34. The light output by the first optical path 30 and the 3 optical outputs of the 3×3 passive optical processing unit 34 correspond to 4 different passive optical projections of the data-modulated optical signal received from the near end of the optical fiber network 16.

The 3×3 passive optical processing unit 34 includes a 3×3 T module serially connected to a 3×3 H module. Properties of such T and H modules were already described with respect to FIGS. 3-4.

Here, the 3×3 T module has three, parallel and optically separate optical paths. One or two of said optical paths have an optical delay element OD', OD'', which causes light received from 2 or 3 different ones of the optical paths P_1, P_2, and P_3 to be relatively delayed at the optical outputs of the 3×3 T module. For example, the produced relative delays may be about the same between optical paths P_1 and P_2 and between optical paths P_2 and P_3. Other embodiments may produce another distribution or relative delays between the light received from the 3 optical paths P_1-P_M.

In various embodiments, the relative delay(s) produced by the 3×3 T module between the light received from one or more pairs of the 3 optical paths P_1-P_3 may be determined or selected based, in part, on the rate of shift of the central optical carrier frequency of the data-modulated optical signal. In particular, the relative delays may be shorter in situations where the central optical carrier frequency shifts more rapidly.

The 3×3 H module optically mixes light received on two or more of the 3 optical inputs thereof, i.e., optically mixes light from different optical outputs of the 3×3 T module. The 3×3 H module functions as a 3×3 nondiagonal matrix, on the complex light fields at its 3 optical inputs, i.e., due to the optical mixing. One example of the 3×3 nondiagonal matrix for the 3×3 H module is:

$$\begin{bmatrix} 1 & 1 & 1 \\ 1 & -0.5 - 0.87i & -0.5 + 0.87i \\ 1 & -0.5 + 0.87i & -0.5 - 0.87i \end{bmatrix}$$

Here, "i" is the square root of −1. Alternatively, the 3×3 H module may correspond to another nondiagonal 3×3 matrix transformation on the 3 complex light fields at its 3 optical inputs. The 3×3 H module may be, e.g., a conventional 3×3 passive optical power coupler such as the 3×3 planar optical waveguide optical mixer with an evanescent field coupling segment as schematically illustrated in FIG. 5.

At 2 or 3 of its optical outputs, the 3×3 H module may output mixture(s) of relatively delayed portions of the light received from the three optical paths P_1-P_3 due to relative delay(s) introduced into light transmitted to the different optical inputs of the 3×3 H module by the 3×3 T module.

In the DD optical data receiver 14_4, light from the first optical path 30 and the 3 optical outputs of the 3×3 H module form 4 different optical projections of the data-modulated optical signal received from the near end of the optical fiber network 16. The intensities of these 4 different optical projections are measured by corresponding ones of the photodetectors 24_0, 24_1, 24_2, and 24_3. The intensity measurement of the photodiode 24_0 is temporally sampled by the analog electrical circuit 26_0 to produce the digital signal b(t). The intensity measurements of the photodiodes 24_1, 24_2 and 24_3 are temporally sampled by the analog electrical sampling circuits 26_1, 26_2, and 26_3 to produce the digital signals $a_1(t)$, $a_2(t)$, and $a_3(t)$, respectively. The 4 digital values b(t), $a_1(t)$, $a_2(t)$, and $a_3(t)$ are transmitted to the DSP 28, approximately in parallel, for use in recovery of transmitted phase and optionally amplitude values of the received data-modulated optical signal, e.g., to recover the temporal series of data symbol values transmitted by the optical data transmitter(s) 12 of FIG. 1.

In the DD optical data receivers 14_2, 14_3, 14_4 of FIGS. 3-5, the DSP 28 may use an iterative algorithm to recover values of the transmitted data-modulated optical signal x'(t), for sample times "t", e.g., to determine a temporal series of phases and optionally amplitudes of said transmitted optical signal. Such recovery of temporal values of the transmitted phase-modulated optical signal x'(t) is made from the intensity measurements, i.e., b(t), $a_1(t)$ . . . $a_M(t)$, of the (M+1) passive optical projections of the received optical signal s(t), i.e., by the photodetectors 24_0-24_M and analog electrical sampling circuits 26_0-26_M as already described. The recovery of temporal values of the data-modulated transmitted optical signal, which carries some data by phase modulation, can be performed, by the DSP 28 from only the measured intensities of such optical projections.

Figure 6:
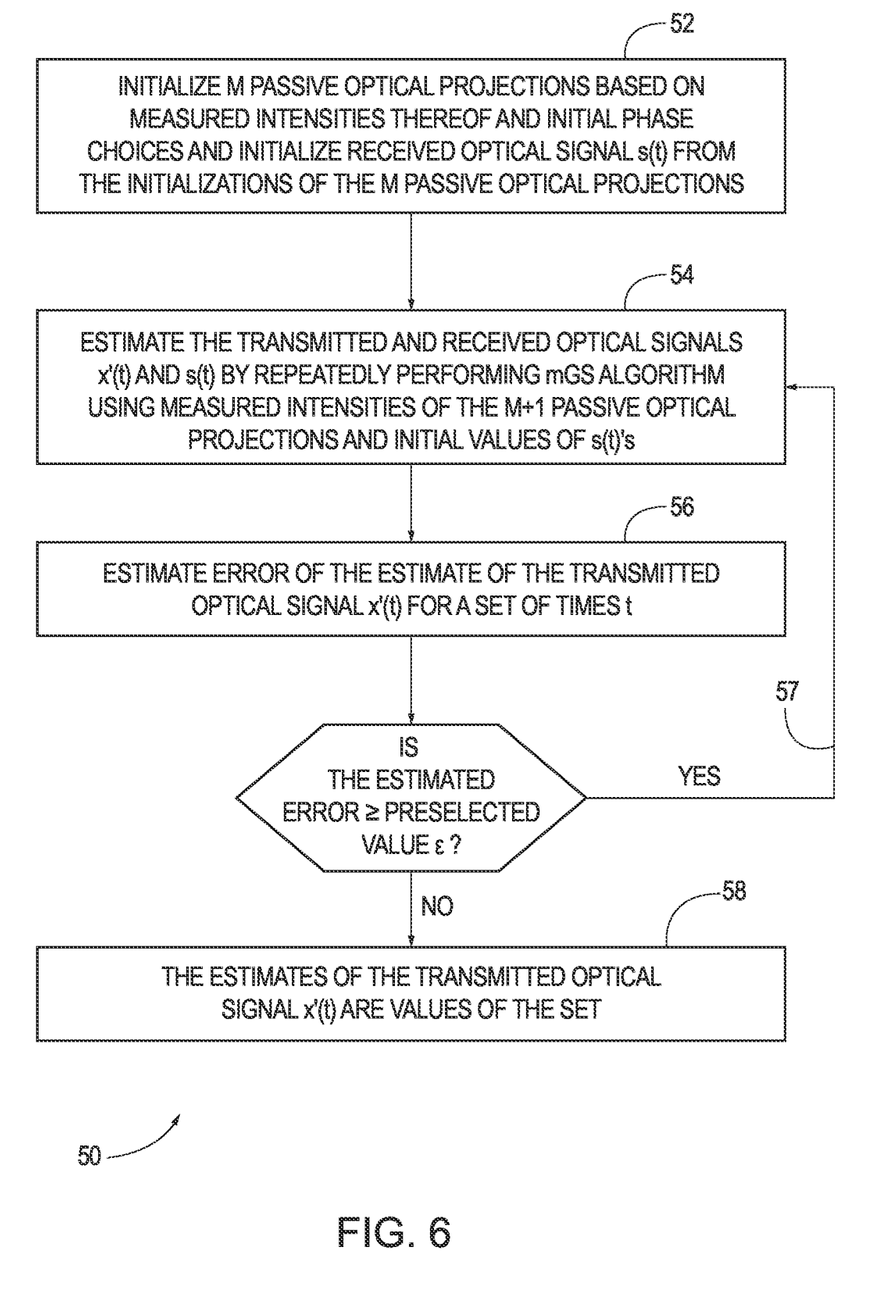
FIGS. 6-7 are flow charts schematically illustrating algorithms for optical signal recovery in a digital signal processor based on intensity measurements of multiple optical projections of a received optical signal, e.g., algorithms for use in the digital signal processors of the DD optical data receivers of FIGS. 2-5.
Figure 7:
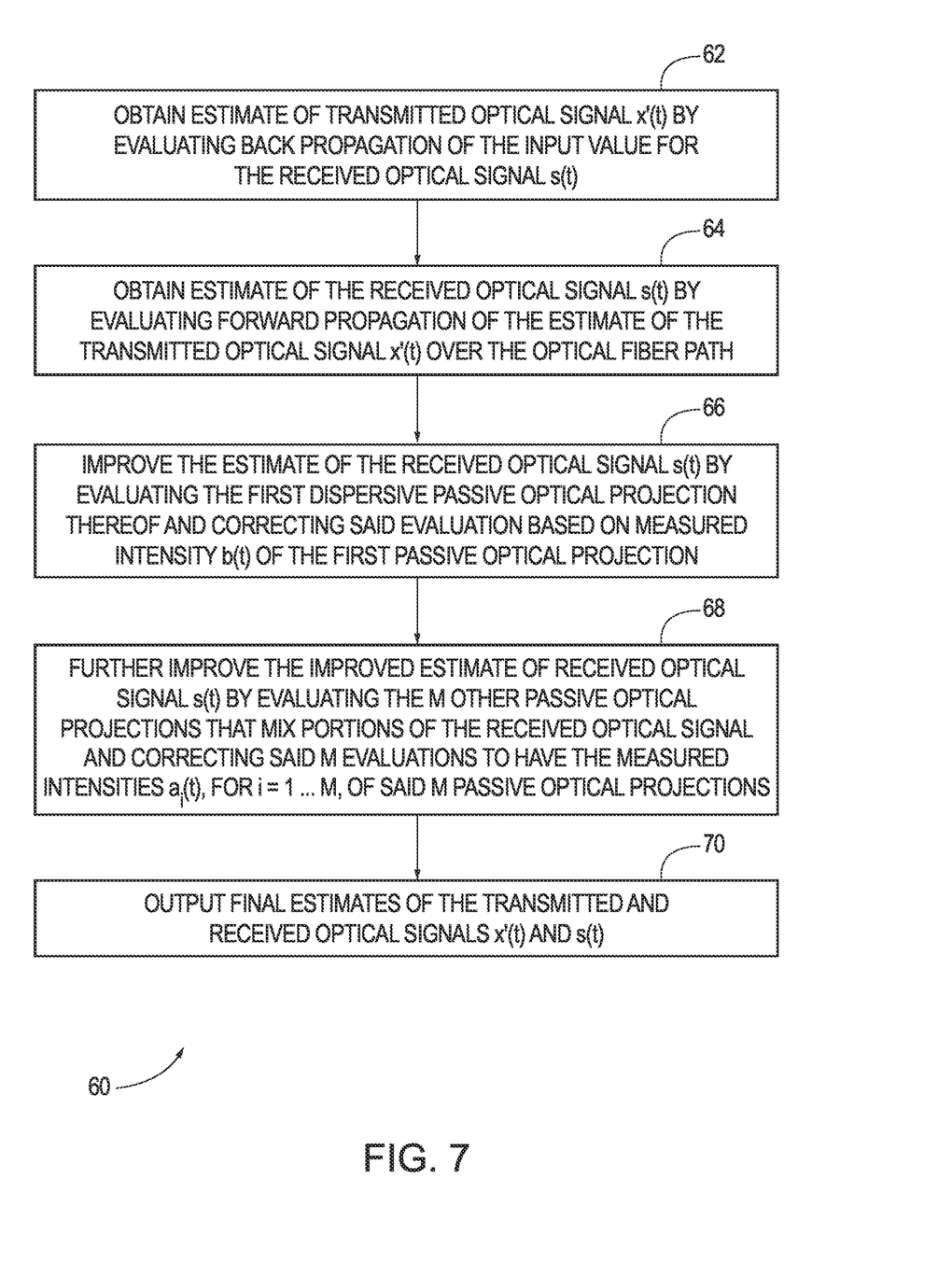

For the DSPs 28 of FIGS. 3-5, an example method for the recovery of the phase and amplitude values of the transmitted optical signal x'(t), from intensity measurements of passive optical projections of the received optical signal s(t) is illustrated in FIGS. 6 and 7. The example method may include, e.g., performing a phase retrieval (PR) algorithm 50, e.g., as illustrated in Pseudo-Code Block A, and performing a modified Gerchberg-Saxton (mGS) algorithm 60, e.g., as illustrated in Pseudo-Code Block B. Both the PR and mGS algorithms 50, 60 use the intensity measurements of the (M+1) passive optical projections of the received data-modulated optical signal s(t), i.e., received from the near end of the optical fiber network 16, to estimate the transmitted phase-modulated optical signal x'(t) for sample times "t".

The PR and mGS algorithms 50, 60 recover transmitted phase and amplitude values based on known optical properties of the relevant optical path in the optical fiber network 16, i.e., between the optical data transmitter 12 and the DD optical data receiver 14_2, 14_3, or 14_4, and known optical properties of the (M+1) passive optical projections done in the DD optical data receiver 14_2, 14_3, 14_4. Such optical properties, e.g., optical channel matrices, may be obtained, e.g., by measurement and pre-programming of the DSP 28 or by training of the DD optical data receiver 14_2, 14_3, 14_4.

Referring to FIG. 6 and Pseudo-Code Block A, the PR algorithm 50 iteratively evaluates the transmitted optical signal x'(t) from the intensity measurements b(t), {$a_i(t)$} of the M+1 passive optical projections of the received optical signal s(t) in the DD optical data receiver 14_2, 14_3, 14_4, e.g., for a block of sampling times t. In the Pseudo-Code Block A, integers N and K are preselected to fix numbers of iterations for various program loops therein.

In various embodiments, the length of the block of sampling times t may be determined or selected based, in part, on an expected rate of shift of the central optical carrier frequency of the data-modulated optical signal, e.g., an expected maximum rate. In particular, the sampling blocks may be shorter in situations where the central optical carrier frequency is expected to shift more rapidly. The inventor has considered sampling blocks having 1 to 100 symbol periods, e.g., 10 symbol periods, for situations in which the expected rate of shift of the central optical carrier frequency of the data-modulated optical signal is low.

At step 52, the PR algorithm 50 includes initializing the phases of the M values for the M passive optical projections $A_i(t)$ . . . $A_M(t)$ produced by the passive optical processing unit 34 of FIGS. 3-5. This step 52 also includes initializing the value of the received optical signal s(t) from the M initialized values of the $A_i(t)$'s. In the example of in Pseudo-Code Block A, the phases of the $A_i(t)$'s are randomly initialized, but different initializations may be used for these M phases. The initialized $A_i(t)$'s are determined from their measured intensities $a_1(t)$ . . . $a_M(t)$ and the initial phases therefor. In the example of the Pseudo-Code Block A, an initial value of s(t) is obtained by evaluating a back propagation by operating with the M-element matrix $\Sigma \cdot \{H \cdot T\}^{-1}$ on the initialized M-element array A(t), i.e., the i-th entry of A(t) is $A_i(t)$. Here, $\Sigma$ is the optical power combiner that performs the time reversed operation of the 1×(M+1) optical power splitter 20 for M optical outputs thereof, and H and T are the known M×M matrices for the respective H and T modules of the passive optical processing unit 34 of FIGS. 3-5.

At step 54, the PR algorithm 50 includes iteratively executing the mGS algorithm 60 to obtain new estimates of the transmitted and received optical signals x'(t) and s(t) from a previously value for the received optical signal s(t) and the measured intensities b(t) and $a_1(t)$-$a_M(t)$ of the (M+1) passive optical projections.

At step 56, the PR algorithm 50 includes estimating an error in the estimated value of the transmitted optical signal x'(t), i.e., from step 54. The error estimate may be, e.g., based on a next estimate x"(t) for the transmitted optical signal, e.g., as evaluated via digital back propagation over the relevant optical path of the optical fiber network 16. In Pseudo-Code Block A, the next estimate x"(t) may be obtained from the performance of part or all of the mGS algorithm 60. In step 56, the estimated error may be a moving average of estimated errors for a set of times t, as shown in Pseudo Code Block A. If the estimated error is greater than or equal to a preselected value £, the PR algorithm 50, in Pseudo-Code Block A, includes looping back 57 to perform more iterations of the mGS algorithm 60 for times tin said set of times. During the loop back, i.e., prior to performing more iterations of the mGS algorithm, the phases of the s(t)'s, of the set of times, are re-initialized, e.g., incremented or decremented by a small randomly fixed amounts, to enable further convergence of the iterative evaluation of x'(t)'s, for the set of times t. If the estimated error is less than the preselected value £, the Pseudo-Code Block A outputs, at step 58, the estimates of the transmitted optical signal x'(t) as the determined values thereof, i.e., for the various times tin the set.

Pseudo-Code Block A—PR Algorithm

1. The evaluation of the back propagation is based on the known optical channel function $h_{CD}(t)$ for the relevant optical path of the optical fiber network 16. In Pseudo-Code Block B, the evaluation of the back propagation may also include bandwidth filtering the optical signal x'(t), e.g., to account for known optical filtering in the optical transmitter 12 and/or may include constraining x'(t) to have known optical pilot symbol values for the slot times "$t_p$" of said known optical pilot symbols.

At step 64, the mGS algorithm 60 includes estimating the received optical signal s(t) by forward propagating the first estimate of the transmitted optical signal x'(t), i.e., from the step 62. In the Pseudo-Code Block B, the evaluation is for forward propagation via the relevant optical path of the

```
function PR(a_i(t), b(t), N, K)
{
% Step 52: Initialize array A(t) and s(t)
for k = 1 ... M
{A(t)}_k = a_k(t)· exp[i·(random-angle)]};
s(t) = ΣE[HT]1A(t);
% Step 54: Performing repetitions of mGS algorithm to estimate x'(t)
  p = 1;
for p ≤ M/K do         % outer loop done M/K times with small phase resets
{
m = 1;
for m ≤ K do           % inner loop done K times without phase resets
{
s(t), x'(t) = mGS(s(t), a_i(t), b(t)); % do mGS algorithm to estimate s(t) and x'(t)
m = m+1;               % Increase m for next repetition of mGS algorithm
}
end;
% Step 56: Find error in estimate of x'(t)
x"(t) = h_CD^-1(t) * s(t);    % Back propagate s(t) to optical transmitter to get second estimate
                              % x"(t) of transmitted optical signal for time t
Err(t) = | |x'(t)|^2 − |x"(t)|^2 |;   % Err(t), i.e., error is absolute value of difference in square magnitudes
                              % of transmitted signal x'(t) from mGS algorithm and transmitted
                              % optical signal x"(t) from back propagation of s(t) to optical data
                              % transmitter
AVErr(t) = MV(Err(t));        % Average error AVErr(t) is moving average MV() of error over a set of
                              % times t, i.e., to smooth peaks at the individual times t in the set
if AVErr(t) > ε
  {
  x'(t) = | x'(t) | · exp(i·(Ph(x'(t)) + random-angle)); % Adjust x'(t) phase by small random change
  s(t) = h_CD(t) * x'(t);     % Downstream propagate x'(t) to update phase of s(t) with a small
                              % random adjustment for the next iterations of the mGS algorithm
  p = p+1;
  }
else if AVErr(t) < ε
% Step 58
return x'(t); % For "t" in the set of times t, output estimates of transmitted optical signal x'(t)
}
```

Referring to FIG. 7 and Pseudo-Code Block B, the mGS algorithm 60 estimates the transmitted and received optical signals x'(t) and s(t) from an input value for the received optical signal s(t) and input values of the measured intensities b(t), {a_i(t)}, i.e., i=1 M, of the (M+1) passive optical projections of the data-modulated optical signal, as received by the DD optical data receiver 14_2, 14_3, 14_4. That is, the mGS algorithm 60 estimates the phase and amplitude of the transmitted data-modulated optical signal based on an initial input for s(t) and measurements of intensities by the DD optical data receiver 14_2, 14_3, 14_4.

At step 62, the mGS algorithm 60 includes evaluating a back propagation of the input value for the optical signal s(t) received at the DD optical data receiver, to obtain a first estimate of the transmitted optical signal x'(t). The evaluation is for a back propagation by the relevant optical path of the optical fiber network 16 from the DD optical data receiver 14_2-14_4 to the optical data transmitter 12 of FIG.

optical fiber network 16 from the optical data transmitter 12 of FIG. 1 to the DD optical data receiver 14_2-14_4. This evaluation is again based on the known channel matrix $h_{CD}(t)$ for the relevant optical path of the optical fiber network 16.

At step 66, the mGS algorithm 60 includes improving the estimate of the received optical signal s(t), from step 64, by evaluating the first passive optical projection of s(t) and correcting said evaluation based on the measured intensity b(t) for said passive optical projection. The first passive optical projection is done by the dispersive first optical path 30 of the DD optical data receiver 14_2-14_4. In the Pseudo-Code Block B, the known dispersive channel matrix $h_D(t)$ of the first optical path 30 is used to evaluate a forward propagation of the estimate of the received optical signal s(t), from the step 64, through the optical power splitter 20 and the dispersive first optical path 30 to obtain an evaluation of the first passive optical projection of s(t). Then, the evaluation of the first passive optical projection is then, corrected to have the measured intensity b(t). Finally, an evaluation of a back propagation of said corrected evaluation of the first passive optical projection through the dispersive first optical path 30 and the optical power splitter 20 is performed to obtain the improved estimate of the received optical signal s(t).

At step 68, the mGS algorithm 60 includes further improving the improved estimate of received optical signal s(t), from the step 66, by evaluating the M other passive optical projections and correcting said M evaluations to have the measured intensities $a_i(t)$. In the Pseudo-Code Block B, the known optical processing by the optical power splitter 20 and the passive optical processing unit 34, i.e., with the T and M modules, that causes mixing of portions of the received optical signal, is used to evaluate these other M passive optical projections from the improved estimate of the received optical signal s(t), from the step 66. Then, said M evaluations of the other M passive optical projections, for time t, are corrected to have the intensities $a_i(t)$, for i=1 . . . M, measured by the DD optical data receiver 14_2-14_4. Finally, the Pseudo-Code Block B includes evaluating a back propagation of said corrected evaluations of these other M passive optical projections though the passive optical processing unit 34 and the optical power splitter 20 to obtain the further improved estimate of the received optical signal s(t).

At step 70, the mGS algorithm 60 returns the final estimates of the transmitted and received optical signals x'(t) and s(t), respectively, Pseudo-Code Block B: Modified Gerchberg-Saxton ("mGS") Algorithm lated for phase recovery based on the polarization coupling in the optical fiber channel(s).

In some embodiments, temporally overlapping, time blocks of sequentially measured intensities of the optical projections and/or light fields, i.e., at different times t, may be used to evaluate Fourier transforms in the above-described iterative algorithms of the DSP 28. In such embodiments, the converged results of iterative estimates of phase values may only be finally retained, i.e., at the termination of the iterative algorithms, for non-overlapping portions of said time blocks, based on measured intensities for said individual blocks, so that said evaluations do not depend significantly on the size(s) of the time blocks used in the algorithms.

In some embodiments, other circuits of the DSP 28 of FIGS. 2-5 may digitally perform optical equalization, e.g., to compensate for chromatic dispersion, polarization rotation and/or polarization mode dispersion. Also, the results of such a digital optical equalization may also be fed back to the loops of the iterative algorithms, e.g., the PR and mGS algorithms 50, 60 of FIGS. 6-7, to improve estimates of the phases and amplitudes of the light fields being recovered and thereby further aid the convergence of the iterative algorithms or to increase the rate of convergence thereof, e.g., to correct evaluated values of pilot symbols. Also, such feedback may be used to adjust intensity measurements of different polarizations of pilot symbols in embodiments supporting polarization division multiplexing.

In the above-described embodiments of FIGS. 2-5, the DSP 28 may be configured to not compensate for polarization rotation, e.g., due to the lack of a local oscillator in the DD optical data receiver(s) of FIG. 1. Also, the DSP 28

---

```
function mGS(s(t), a_i(t), b(t))
{
% Step 62: Estimate transmitted optical signal x'(t) from input s(t) by evaluating back propagation
x'(t) = h_CD^-1(t) * s(t);      % Back propagate s(t) based on channel matrix h_CD(t) of the relevant optical
                                 % path of the optical fiber network 16
x'(t) = h_BW(t) * x'(t);         % Filter optical signal by bandwidth filter function h_BW(t) of
                                 % optical data transmitter 12
x'(t_p) = x_P;                   % Adjust x'(t) to have known pilot symbol value(s) x_P at pilot time(s) t_P
% Step 64: Estimate received optical signal s(t) by forward propagating x'(t)
s(t) = h_CD(t) * x'(t);          % Forward propagate x'(t) over the relevant optical path of the optical fiber
                                 % network 16 based on hcp(t).
% Step 66: Improve estimate of s(t) by evaluating and correcting first passive optical projection
d(t) = h_D(t) * s(t);            % Evaluate optical projection d(t) via channel matrix h_D(t) of first optical path 30
d(t) = [b(t)]^1/2 · exp[i-Ph(d(t))]; % Constrain d(t) to have measured intensity b(t).
                                 % Ph( ) is the phase angle of ( ).
s(t) = [h_D(t)]^-1 * d(t);       %Back propagate over first optical path 30 to get improved estimate of s(t)
% Step 68: Further improve estimate of s(t) by evaluating and correcting M other optical projections
For j = 1 ... M, initially j = 1,   % Loop to evaluate M-component array A(t)
do
{
Ph(a_j(t)) = Ph([H·T·S·A(t)]_j);   % Evaluate propagation of s(t) through optical power splitter S and
                                    % optical H·T module to find phases of other M passive optical projections
A_j(t) = a_j(t) exp[i·Ph(a_j(t))]; % A(t) is an M component array with j-th component A_j(t), these M
                                    % passive optical projections are corrected by measured intensities thereof
}
s(t) = Σ·[H·T]^-1·A(t);            % Back propagate A(t), i.e., array of M corrected passive optical projections,
                                    % through passive optical processing unit 34 and optical power splitter 20 to
                                    % get more improved estimate of received optical signal s(t). Σ matrix is the
                                    % reverse combining action of M optical outputs of optical power splitter 20.
return s(t), x'(t); }
```

---

In other embodiments, the passive optical processing unit 34 of FIG. 3 may be replaced by a passive optical processor that combines the passive optical processing to relatively delay and to optically mix the M portions of the optical signal input thereto.

Also, in some embodiments, which employ polarization multiplexing, some of the pilot symbols may be precalcuwould not need to compensate for frequency-offset estimation, which is used in conventional intradyne coherent optical detection.

In the above-described embodiments of FIGS. 2-5, the DSP 28 may perform parallel block-wise digital signal processing of blocks of symbol slots, i.e., approximately parallel processing, and may optionally overlap adjacent blocks, e.g., even by 50%, e.g., by an overlap-save method to compute circular convolutions. In various embodiments, such block-wise digital signal processing of symbol slots and/or the overlap between adjacent such blocks may also be determined or selected based, in part, on the expected maximum rate of shift of the central optical carrier frequency of the received data-modulated optical signal.

Compared to a conventional coherent optical data receivers, some of the DD optical data receivers 14, 14_1, 14_2, 14_3, 143_4 of FIGS. 1-5 may have lower optical signal noise ratio (OSNR) penalties. Thus, forward-error correction (FEC) threshold may be adopted for current PONs, e.g., when detecting 40-Gbaud QPSK signals.

Also, some embodiments of the DD optical data receivers 14 of Figure may have strong tolerance to the linewidth(s) of the laser(s) 6 of the ONUs 4_1-4_Q, i.e., as already insinuated.

From the disclosure, drawings, and/or claims, other embodiments of the inventions will be apparent to those of ordinary skill in the relevant arts.

What is claimed is:

1. An apparatus, comprising:
   a time division multiplexed-passive optical network (TDM PON) optical transceiver including a direct-detection optical receiver; and
   wherein the direct-detection optical receiver is capable of demodulating data from a temporal segment of a data modulated optical signal, the optical carrier frequency of the segment varying at a rate of, at least, 1 giga-Hertz per second.

2. The apparatus of claim 1, wherein the optical carrier frequency of the segment varies at a rate of, at least, 10 giga-Hertz per second.

3. The apparatus of claim 1, wherein the optical carrier frequency of the segment varies at a rate of, at least, 100 giga-Hertz per second.

4. The apparatus of claim 1, wherein the optical carrier frequency of the segment varies at a rate of, at least, 1000 giga-Hertz per second.

5. The apparatus of claim 1, wherein the direct-detection optical data receiver comprises an optical power splitter, an array of at least three optical intensity detectors, and a digital signal processor, the digital signal processor is connected to receive digital values of intensity measurements from each of the optical intensity detectors of the array and to recover data of the received data-modulated optical signal from the digital values of the intensity measurements; and
   wherein the first optical intensity detector is connected to receive light from the optical power splitter via a dispersive optical path and the remaining of the optical intensity detectors of the array are connected to receive light from the optical power splitter via a multiple input and multiple output passive optical processing unit; and
   wherein the passive optical processing unit is configured to optically mix light received on different optical inputs thereof.

6. The apparatus of claim 5, wherein the passive optical processing unit is configured to optically mix light from at least two optical inputs thereof with a relative time delay.

7. The apparatus of claim 6, wherein the relative time delay is bigger than a temporal broadening produced by the dispersive optical path on data symbols of the received data-modulated optical signal.

8. The apparatus of claim 5, wherein the passive optical processing unit is configured to optically mix light from at least three of the optical inputs thereof.

9. The apparatus of claim 1, wherein the direct-detection optical receiver is configured to demodulate the data without mixing the received data modulated signal with an optical local oscillator.

10. The apparatus of claim 1, wherein the direct-detection optical receiver is configured to demodulate the data without mixing the received data modulated signal with a received co-propagating optical tone.

11. The apparatus of claim 1, wherein the optical transceiver is an optical line terminal (OLT).

12. The apparatus of claim 11, further comprising one or more optical network units (ONUs) optically connected to the OLT by a PON network, at least one of the one or more ONUs having a laser source to generate the data modulated optical signal.

13. The apparatus of claim 12, wherein the laser source is an internal cavity laser.

14. The apparatus of claim 12, wherein the TDM PON optical transceiver is configured to recover data optically transmitted by the one of the one or more ONUs within a first 20 micro-seconds of turning on the laser source of the one of the one or more ONUs.

15. The apparatus of claim 1, wherein the TDM PON optical transceiver is configured to recover data optically transmitted from an optical transmitter within a first 20 micro-seconds of turning on a laser of the optical transmitter.

16. The apparatus of claim 5, wherein the TDM PON optical transceiver is configured to recover data optically transmitted from an optical transmitter within a first 20 micro-seconds of turning on a laser of the optical transmitter.

17. The apparatus of claim 13, wherein the laser source is one of a distributed feedback laser and a distributed Bragg reflector laser.

18. The apparatus of claim 12, wherein the laser source is not protected from receiving light by an optical isolator.

19. The apparatus of claim 12, wherein the one of the one or more ONUs does not have a temperature sensor for detecting a temperature of the laser source.

20. The apparatus of claim 12, wherein the one of the one or more ONUs is configured to operate the laser source without active temperature stabilization.

* * * * *